United States Patent
Yukawa

(10) Patent No.: US 7,395,845 B2
(45) Date of Patent: *Jul. 8, 2008

(54) PNEUMATIC RADIAL TIRE

(75) Inventor: Naoki Yukawa, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 59 days.

This patent is subject to a terminal disclaimer.

(21) Appl. No.: 10/892,290

(22) Filed: Jul. 16, 2004

(65) Prior Publication Data

US 2005/0016654 A1 Jan. 27, 2005

(51) Int. Cl.
*B60C 9/00* (2006.01)
(52) U.S. Cl. .................. 152/526; 152/531
(58) Field of Classification Search .......... 152/526, 152/531
See application file for complete search history.

(56) References Cited

U.S. PATENT DOCUMENTS

| 5,397,527 | A  | * | 3/1995 | Rim et al. | 264/210.8 |
| 6,557,605 | B2 | * | 5/2003 | Yukawa et al. | 152/531 |
| 6,581,662 | B2 | * | 6/2003 | Yukawa et al. | 152/527 |

FOREIGN PATENT DOCUMENTS

| DE | 195 09 824 A1 | 9/1996 |
| EP | 1 203 672 A2 | 5/2002 |
| EP | 1 396 355 A1 | 3/2004 |
| JP | 7 215011 A | 8/1995 |
| JP | 2002-137606 A | 5/2002 |
| JP | 2002-144814 A | 5/2002 |
| JP | 2003-072316 | * 3/2003 |

OTHER PUBLICATIONS

Macxhine translation of JP 2003-072316 (Mar. 12, 2003).*

* cited by examiner

*Primary Examiner*—Justin R. Fischer
(74) *Attorney, Agent, or Firm*—Birch, Stewart, Kolasch & Birch, LLP

(57) ABSTRACT

A belt layer is provided at its outer side with a band layer comprising edge bands on left and right sides. When a cross sectional area of one band cord is defined as S (unit; mm$^2$) and a modulus of the band cord when its elongation is 2% is defined as M (unit; N/mm$^2$) and disposition density of the band cord per 1 cm of the band layer is defined as D (unit; the number of band cords/cm), an elongation resistance value K (unit; N·the number of band cords/cm) of the band layer which is determined by the following equation (1) is set to 270 or higher and 830 or lower:

$$K = S \times M \times D / 100. \quad (1)$$

An elongation percentage T(%) of the band cord in a tire in its natural state in which the tire is not assembled to a rim is set to 0.75% or higher and 1.2% or lower.

5 Claims, 3 Drawing Sheets

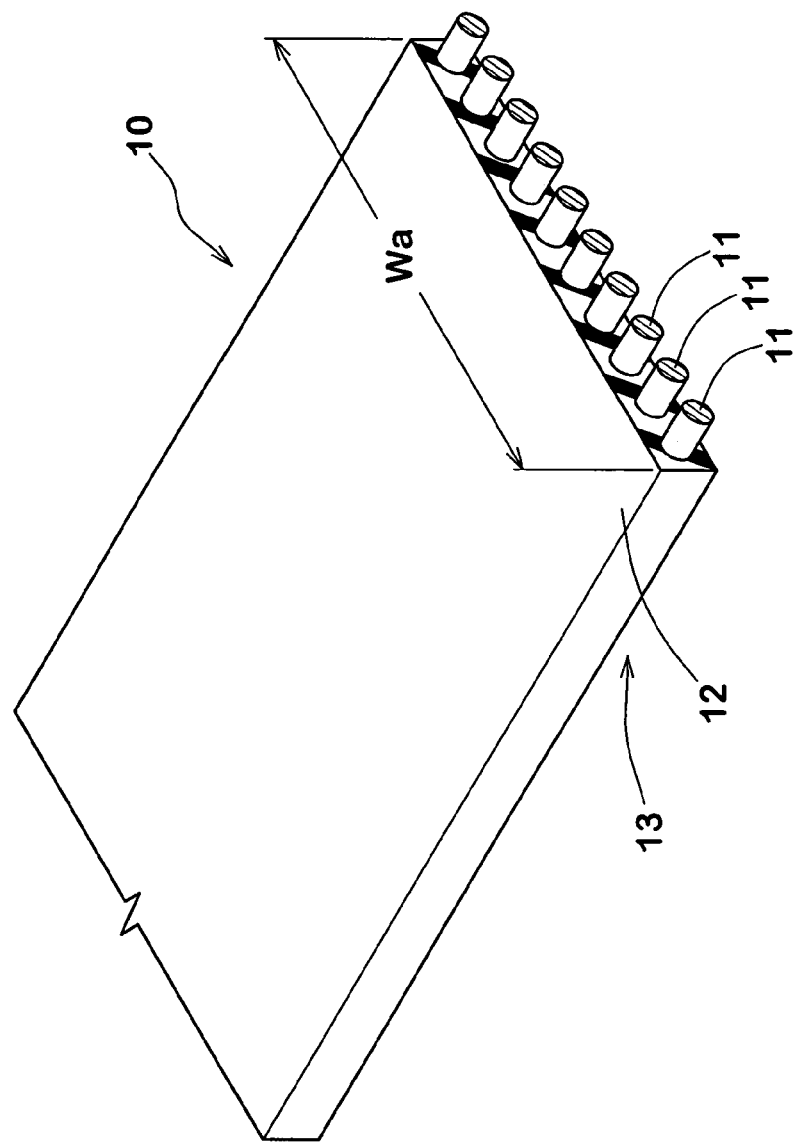

PNEUMATIC RADIAL TIRE

This Nonprovisional application claims priority under 35 U.S.C. § 119(a) on Patent Application No(s). 2003-279390 filed in Japan on Jul. 24, 2003, the entire contents of which are hereby incorporated by reference.

BACKGROUND OF THE INVENTION

1. Field of the Invention

The present invention relates to a pneumatic radial tire capable of reducing not only a road noise in a high frequency band but also a road noise in a low frequency band.

2. Prior Art

Conventionally, in order to improve high speed endurance, a band layer in which band cords made of organic fiber such as nylon is spirally wound is provided around an outer side of a belt layer of a pneumatic radial tire. It is known that if such a structure is employed, resonance frequency of the tire is increased, and a road noise is reduced in high frequency band of 250 Hz or higher.

The present assignee has proposed a pneumatic tire capable of reducing the road noise without deteriorating passing noise by using higher modulus cords as the band cords and by limiting the characteristics of the band layer in a tread central region. For example, see Japanese Patent Applications Laid-open No. 2002-137606 and No. 2002-144814.

In a tire having a conventional band layer, however, if the road noise in the high frequency band is reduced, there is a problem that it becomes difficult to reduce a road noise in a low frequency band of about 125Hz to 160Hz, and the noise is increased depending upon frequency characteristics of a vehicle.

Thereupon, the present inventor researched a winding manner of the band cords. As a result, the present inventor found that if high modulus cords were wound loosely such that they were not extended so much instead of winding the high modulus cords such that a binding force was increased as in the conventional technique, not only a road noise in the high frequency band but also a road noise in the low frequency band could be reduced, and the inventor completed this invention.

SUMMARY OF THE INVENTION

An elongation resistance value K of a band layer is determined based on a cross sectional area S of band cords, modulus M when elongation is 2%, and disposition density D of the band cords per 1 cm width of the band layer. An elongation percentage of the band cords in a tire in its natural state in which the tire is not assembled to a rim is specified. Based on this idea, it is an object of the present invention to provide a pneumatic radial tire capable of reducing not only a road noise in a high frequency band but also a road noise in a low frequency band.

The present invention provides a pneumatic radial tire comprising a belt layer disposed inside a tread portion and outside a carcass in a radial direction of the tire, and a band layer having edge bands disposed radially outward of the belt layer and at opposite ends of the belt layer, wherein when a cross sectional area of one band cord is defined as S (unit; $mm^2$) and a modulus of the band cord when its elongation is 2% is defined as M (unit; $N/mm^2$) and disposition density of the band cord per 1 cm of the band layer is defined as D (unit; the number of band cords/cm), an elongation resistance value K (unit; N·the number of band cords/cm) of the band layer which is determined by the following equation (1) is set to 270 or higher and 830 or lower:

$$K = S \times M \times D / 100 \qquad (1)$$

and elongation percentage T(%) of the band cord in a tire in its natural state in which the tire is not assembled to a rim is set to 0.75% or higher and 1.2% or lower.

Since the present invention has the above-described structure, it is possible to reduce not only a road noise in a high frequency band but also a road noise in a low frequency band.

BRIEF DESCRIPTION OF THE DRAWINGS

FIG. 2 is a perspective view of a band-like ply used for a band layer; and

DETAILED DESCRIPTION OF THE INVENTION

An embodiment of the present invention will be explained with reference to the drawings.

Figure 1:
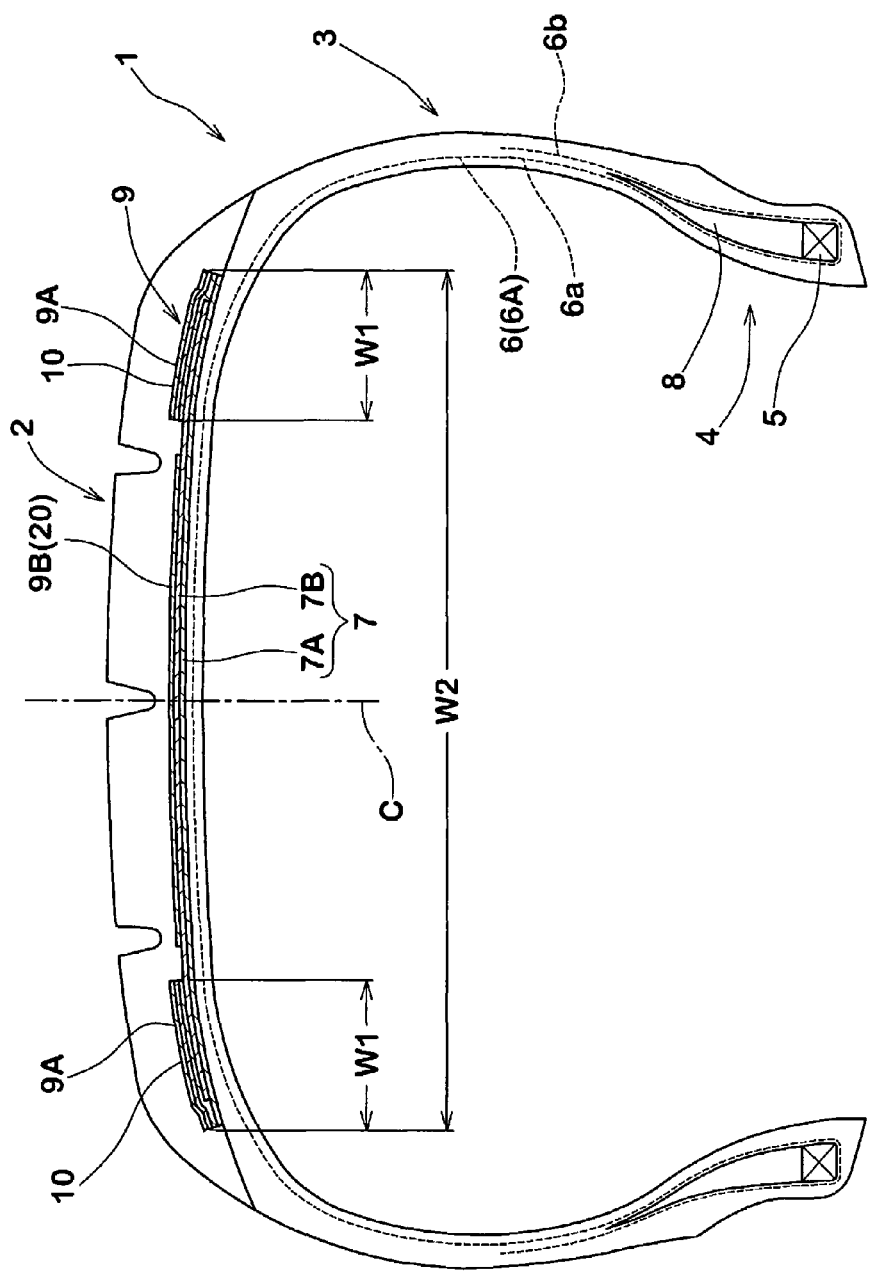
FIG. 1 is a sectional view showing an embodiment of a pneumatic radial tire of the present invention.

In FIG. 1, a pneumatic radial tire 1 (tire 1, hereinafter) at least includes a carcass 6 extending from a tread portion 2 to a bead core 5 of a bead portion 4 through a sidewall portion 3, a belt layer 7 disposed inside the tread portion 2 and outside the carcass 6 in a radial direction of the tire, and a band layer 9 disposed outside the belt layer 7 in the radial direction.

The carcass 6 is formed of one or more, in this embodiment, one carcass ply 6A in which carcass cords are arranged at an angle of 75° to 90° with respect to the tire equator C. The carcass ply 6A is integrally provided at its opposite ends with ply folded-back portions 6b. The ply folded-back portion 6b includes a ply body portion 6a which extends between the bead cores 5 and 5. The ply folded-back portion 6b is folded back from inside to outside around the bead core 5 in the axial direction of the tire at an end of each of the ply body portions 6a. A bead apex rubber 8 for reinforcing the bead is disposed between the ply body portion 6a and the folded-back portion 6b. The bead apex rubber 8 extends from the bead core 5 radially outward of the tire in a tapered manner. The carcass cord is made of polyester in this embodiment, the material is not limited to this only, and organic fiber such as nylon, rayon and aramid, or steel may be used if necessary.

The belt layer 7 is formed of two or more, in this embodiment, two belt plies 7A and 7B in which belt cords are arranged at an angle of 15° to 45° with respect to the tire equator C. The belt cords of the belt layer 7 intersect with each other between the plies to enhance the belt rigidity, and the belt cords strongly reinforce substantially the entire width of the tread portion 2 with hoop effect. A ply width BW of the radially inner belt ply 7A is wider than the outer belt ply 7B, and the maximum ply width W2 is a belt width W2 of the belt layer 7. Although the belt cord is made of steel in this embodiment, organic fiber having high modulus may also be employed if necessary. Examples of the organic fiber are polyethylene naphthalate (PEN), polyethylene terephthalate (PET) and aromatic polyamide.

The band layer 9 comprises a pair of left and right edge bands 9A and 9A disposed on outer ends of the belt layer 7 and radially outward of the belt layer 7. Each edge band 9A is formed of at least one layer, in this embodiment, three layers of edge band plies 10.

A band width W1 of the edge band 9A in the axial direction of the tire is 2% or more and 20% or less of the belt width W2 of the belt layer 7. If the band width W1 is less than 2% of the belt width W2, road noise reducing effect in both the high frequency band and low frequency band can not sufficiently be exhibited. If the band width W1 exceeds 20% of the belt width W2, although the road noise reducing effect is slightly enhanced in the high frequency band, sufficient road noise reducing effect can not be exhibited in the low frequency band, costs of the tire is increased unnecessarily, and passing noise is also increased.

As shown in FIG. 2, each of the edge band plies 10 is formed in such a manner that one or more (as in this embodiment) band cords 11 are lined up and embedded in a topping rubber 12 to form a small-width tape-shaped band-like ply 13, and the band-like ply 13 is spirally wound in a circumferential direction of the tire. At that time, an angle of the band cord 11 formed with respect to the circumferential direction of the tire is set to 5° or less. With this design, the edge band ply 10 can be of a seamless structure, and this enhances the uniformity of the tire, and strongly restrains the belt layer 7. In this embodiment, the band-like ply 13 has about ten lined up band cords 11 and has a width Wa of about 10 mm. Here, in order to appropriately secure a binding force by the edge band ply 10, it is preferable to wind the band-like ply 13 three times or more. Therefore, when the band width W1 is to be made 10% or less of the belt width W2 of the belt layer 7, since the band-like ply 13 is wound three times or more, it is preferable that the number of band cords of the band-like ply 13 is in a range of 1 to 5, and the width Wa is 5 mm or less.

Next, in order to obtain the road noise reducing effect in both the high frequency band and low frequency band, it is preferable that the band cord 11 is made of organic fiber having high modulus such as polyethylene naphthalate (PEN), polyethylene terephthalate (PET), aromatic polyamide, poly para-phenylene benzobis oxazole (PBO) and more specifically, the band cord 11 has 2% modulus of 8,000 $N/mm^2$ or more, and more preferably 10,000 N/mm2 or more. Especially, PEN can preferably be used because it has low energy loss (tanδ), physical variation caused by temperature is reduced, and is inexpensive.

In this invention, when a cross sectional area of one band cord 11 is defined as S (unit; $mm^2$) and a modulus of the band cord 11 when its elongation is 2% is defined as M (unit; $N/mm^2$) and disposition density of the band cord per 1 cm of the band layer 9 is defined as D (unit; the number of band cords/cm), an elongation resistance value K (unit; N·the number of band cords/cm) of the band layer which is determined by the following equation (1) is set to 270 or higher and 830 or lower:

$$K = S \times M \times D / 100 \quad (1)$$

and elongation percentage T(%) of the band cord 11 in a tire in its natural state in which the tire is not assembled to a rim is set to 0.75% or higher and 1.2% or lower.

The "modulus M" is a tensile elastic modulus when the elongation is 2% and which is measured at tensile speed 30±2 cm/minute by a tensile strength and elongation percentage test (paragraph 8.5) in a testing method of a chemical fiber tire cord of JIS L1017.

The "elongation percentage T" is an elongation percentage (%) of the band cord 11 in the tire in its natural state in which the tire is not assembled to a rim. In the case of a conventional tire, the elongation percentage T is 1.6% or higher, and usually 2 to 4%. It is difficult to actually measure the elongation percentage of the band cord 11 existing in the tire. Therefore, in this specification, the elongation percentage is measured in accordance with the following procedure.

Figure 3A:
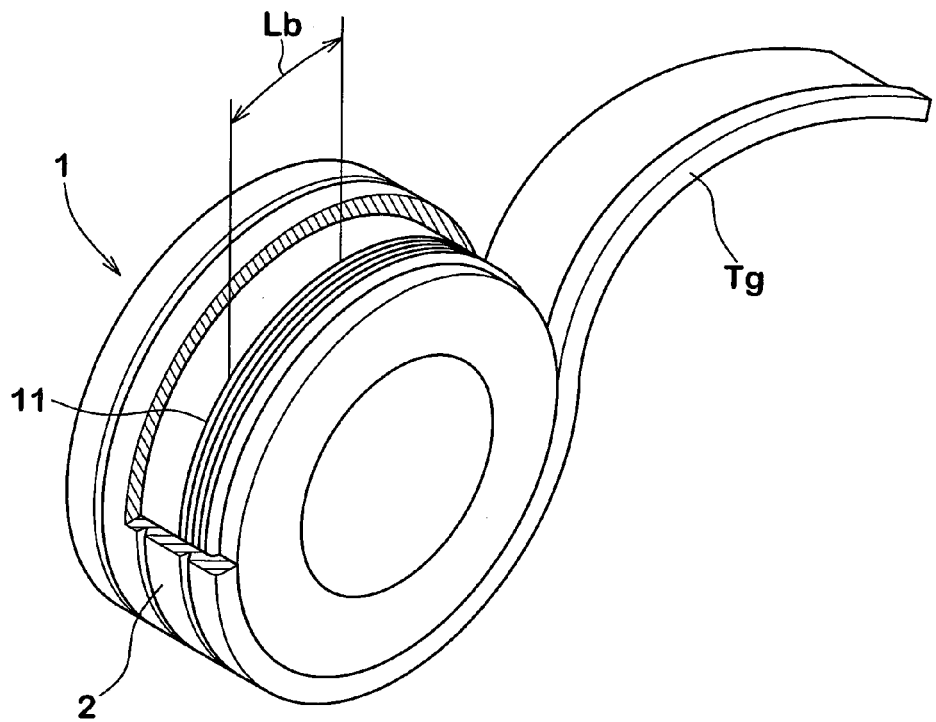
FIGS. 3(A) and (B) are perspective views showing a measuring method of an elongation percentage of a band cord.

First, as shown in FIG. 3 (A), a knife is inserted into the tread portion 2 of the tire 1 (internal pressure is atmospheric pressure) in its natural state in which the tire is not assembled to a rim, a tread rubber Tg is peeled off in the circumferential direction of the tire so that the band cord 11 is exposed to the surface. In this state, a length Lb of the band cord 11 is measured at a certain section in the circumferential direction of the tire. The certain section may be arbitrarily set, but it is preferable that the certain section is set such that the length Lb becomes 1 m or longer so as to precisely measure the elongation percentage of the band cord 11.

Figure 3B:
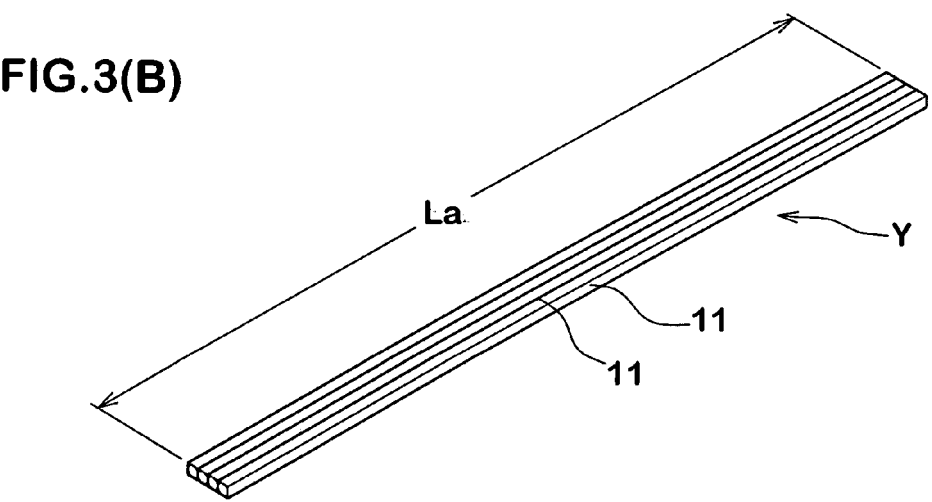

Next, as shown in FIG. 3(B), the band cord 11 having the length Lb in the tire is peeled off from the tire as a tape-like sample piece Y having a width of ½ or wider of the band layer together with the peripheral rubber. It is preferable that rubber adhering to the band cord 11 of the sample piece Y is thinned as thin as possible and peeled off. Then, this sample piece Y is left at a room temperature (temperature 20°, humidity 65%) for 24 hours to remove a load from the sample piece Y and allow the sample piece Y to shrink sufficiently. That is, the band cord 11 in the tire has a constant elongation, but if the band cord 11 is taken out from the tire, load acting on the band cord 11 is removed, and the elongation can be shrunk. Then, a length La of the band cord 11 of each sample piece Y after 24 hours are elapsed is measured, and shrinkage ratio (%) of the band cord 11 is obtained by $\{(Lb-La)/Lb\} \times 100$, and its average is used. For convenience' sake, this shrinkage ratio is used as the elongation percentage T(%) of the band cord in the tire in its natural state.

Here, the elongation resistance value K is a value showing an index of a resistance force against the elongation per unit width and unit length of the band layer. As this value K is greater, the binding force with respect to the belt layer 7 is greater. The elongation percentage T is an elongation of the band cord 11 in the tire in its natural state. As this value T is smaller, the band cord 11 is wound weaker.

As a result of research of the present inventor, he found that if the band layer 9 having great elongation resistance value K was disposed in a tread shoulder region without tightly fastening the band layer 9, i.e., with a small elongation percentage T, an adverse influence acting on a resonant mode in the low frequency band caused by the band layer 9 could be reduced, and a natural frequency affecting on the high frequency band could be enhanced. With this structure, as compared with a tire in which a conventional belt layer is disposed, it is possible to reduce the road noise level in both the low frequency band and high frequency band.

If the elongation percentage T is less than 0.75%, it is difficult to produce the tire according to the conventional tire producing method. If the elongation resistance value K is less than 270, the minimum binding force with respect to the belt layer 7 can not be secured and thus, the high speed endurance can not be enhanced and the road noise reducing effect in the high frequency band can not be exhibited. If the elongation percentage T exceeds 1.2%, the binding force of the band becomes excessively strong, the finished shape of the tire is deteriorated, and the road noise reducing effect in the low frequency band can not be exhibited. As the elongation resistance value K exceeds 270 and becomes great; the road noise reducing effect of the high frequency band is enhanced. However, if the elongation resistance value K exceeds 830, the finished shape of the tire is deteriorated, and even if the elongation percentage T is reduced to 1.2% or lower, the road noise in the low frequency band can not sufficiently be reduced.

From such a viewpoint, it is preferable that the elongation resistance value K is in a range of 360 to 830, and more preferably in a range of 420 to 830. It is preferable that the elongation percentage T is in a range of 0.75 to 1.0%. This range of the elongation percentage T can be set by changing the number of twists, a twisting method, a twisting pitch or the like, or by changing the outline shape of the deck (drum) which forms a tread ring.

In the case of the band cord 11, as the band cord having higher modulus as higher binding force with respect to an instant variation. Therefore, a band cord having high modulus is effective for reducing the road noise. Thus, a low modulus cord such as nylon is not preferable. For this reason, as described above, a cord having high 2% modulus of 8,000 N/mm$^2$ or higher, and more preferably 10,000 N/mm$^2$ such as PEN cord is preferably employed.

In this embodiment, in order to secure higher elongation resistance value K, the edge band 9A has three edge band plies 10. If the thick band cord 11 is used to enhance the elongation resistance value K instead of increasing the number of layers, there are problems that the bending rigidity becomes excessively high and the rigidity of the tread portion 2 is varied. Therefore, it is preferable that the cross sectional area S of the band cord is in a range of 0.10 to 0.35 mm$^2$.

Next, in the tire of the present invention, an intermediate band 9B comprising an intermediate band ply 20 using a low modulus band cord can be formed between the edge bands 9A and 9A in the middle of the tire equator C. The number of intermediate bands 9B is smaller than that of the edge bands 9A and 9A, and in this embodiment, the intermediate band 9B comprises one intermediate band ply 20.

A main reason why the intermediate band 9B is formed is that a central region of the tread is prevented from being deformed roundly when the internal pressure is charged, a rolling resistance is prevented from being deteriorated by the increased deformed amount of the tread when it comes into contact with the ground, and the rigidity variation between the intermediate band 9B and the tread shoulder region is reduced to prevent the deviated wear from being caused.

For this purpose, in the intermediate band 9B, the elongation resistance value Kc (unit; N·the number of band cords/cm) is set smaller than the elongation resistance value K of the edge band 9A, and more preferably in a range of 30 to 120. If the elongation resistance value Kc is less than 30, there is no effect, and if the elongation resistance value Kc exceeds 120, the road noise reducing effect in the low frequency band can not sufficiently be exhibited, and a passing noise (noise outside vehicle) is increased.

Preferable examples of the low modulus band cord used as the intermediate band 9B are nylon, polyester, vinylon and the like having 2% modulus of 6,000 N/mm$^2$ or lower and more preferably in a range of 1,500 to 5,000 N/mm$^2$. Especially nylon can preferably be employed because it is inexpensive and it can be handled easily.

It is preferable that the elongation percentage Tc (%) of the band cord of the intermediate band 9B is greater than the elongation percentage T (%) of the band cord of the edge band 9A. A ratio Tc/T is preferably smaller than a ratio K/Kc between the elongation resistance value Kc of the intermediate band 9B and the elongation resistance value K of the edge band 9A.

Although the embodiment of the present invention has been described in detail, the pneumatic radial tire of the invention can be applied to various radial tires for not only a passenger car but also a small truck, a heavy-load vehicle and a two-wheeled vehicle, and the invention is not limited to the illustrated embodiment and can variously be modified and carried out.

EXAMPLE 1

Tires having size of 195/65R15 were prototyped based on specifications shown in Table 1, and the road noise in the low frequency band (160 Hz) and the high frequency band (250 to 315 Hz) of each prototyped tire was tested. Specifications other than those shown in Table 1 are substantially the same in the prototyped tires.

In "band structure" in Table 1, 1FB means a structure comprising one full band ply, 1EB to 3EB mean a structure comprising one to three edge band plies, and 3EB+1CB means a structure comprising three edge band plies and one intermediate band ply. Specifications of the intermediate band ply are shown in Table 2.

The test method is as follows:

(1) Road Noise Performance

The prototyped tires were mounted on all wheels of an FF vehicle (piston displacement of 2,000 cc) having rims (15×6 JJ) under an internal pressure (200 kPa), the vehicle was allowed to run on a smooth road surface at 50 km/h, the sum of a noise level (dB) of 160 Hz as low frequency band and a noise level (dB) of 250 Hz and 315 Hz as the high frequency band were measured at a position of a left ear on a driver's seat. The noise was evaluated with a variation amount of the noise level while using a comparative example tire 1 as a reference value. In Table 1, "–(minus)" means that this noise is lower than road noise of the comparative example tire 1 and is excellent.

TABLE 1

|  | Comparative Example 1 | Comparative Example 2 | Example 1 | Example 2 | Example 3 | Example 4 | Example 5 |
|---|---|---|---|---|---|---|---|
| Band layer |  |  |  |  |  |  |  |
| Band structure | 1FB | 1EB | 3EB | 3EB | 3EB + 1 CB | 2EB | 1EB |
| Cord material | Nylon | PEN | PEN | PEN | PEN | PEN | PEN |
| Cord cross sectional area S (mm$^2$) | 0.248 | 0.246 | 0.246 | 0.246 | 0.246 | 0.246 | 0.246 |
| 2% modulus M (N/mm$^2$) | 3228 | 11235 | 11235 | 11235 | 11235 | 11235 | 11235 |
| Disposition density D' per one layer (the number of cords/cm) | 10 | 10 | 10 | 10 | 10 | 10 | 10 |

TABLE 1-continued

|  |  |  |  |  |  |  |  |
|---|---|---|---|---|---|---|---|
| Elongation resistance value K' per one layer (the number of cords/cm) | 80 | 276 | 276 | 276 | 276 | 276 | 276 |
| Elongation resistance value K of band layer (the number of cords/cm) | 80 | 276 | 828 | 828 | 828 | 552 | 276 |
| Band width W1 (mm) | 148 | 30 | 30 | 30 | 30 | 30 | 30 |
| (Ratio of width with respect to belt) (%) | 100 | 20 | 20 | 20 | 20 | 20 | 20 |
| Elongation percentage T (%) of cord | 1.6 | 1.4 | 1.2 | 0.8 | 0.8 | 0.8 | 0.8 |
| Ply width Wa (mm) of band-like ply | 10 | 10 | 10 | 10 | 10 | 10 | 10 |
| The number of cords of band-like ply | 10 | 10 | 10 | 10 | 10 | 10 | 10 |
| The number of windings of band-like ply | 15 | 3 | 3 | 3 | 3 | 3 | 3 |
| Road noise performance |  |  |  |  |  |  |  |
| Low frequency band region (dB) | Reference | −0.1 | −1.7 | −2 | −2.1 | −1.0 | −0.7 |
| High frequency band region (dB) | Reference | −2.9 | −3 | −3.3 | −3.4 | −2.7 | −2.8 |

|  | Example 6 | Example 7 | Example 8 | Example 9 | Example 10 | Example 11 |
|---|---|---|---|---|---|---|
| Band layer |  |  |  |  |  |  |
| Band structure | 1EB | 1EB | 1EB | 3EB | 3EB | 3EB |
| Cord material | PEN | PEN | PEN | PEN | PEN | PEN |
| Cord cross sectional area S (mm$^2$) | 0.246 | 0.246 | 0.246 | 0.162 | 0.246 | 0.246 |
| 2% modulus M (N/mm$^2$) | 11235 | 11235 | 11235 | 12592 | 8657 | 11235 |
| Disposition density D' per one layer (the number of cords/cm) | 10 | 10 | 10 | 10 | 10 | 10 |
| Elongation resistance value K' per one layer (the number of cords/cm) | 276 | 276 | 276 | 122 | 213 | 276 |
| Elongation resistance value K of band layer (the number of cords/cm) | 276 | 276 | 276 | 366 | 639 | 828 |
| Band width W1 (mm) | 30 | 10 | 40 | 30 | 30 | 10 |
| (Ratio of width with respect to belt) (%) | 20 | 6.7 | 27 | 20 | 20 | 6.7 |
| Elongation percentage T (%) of cord | 0.8 | 0.8 | 0.8 | 0.8 | 0.8 | 0.8 |
| Ply width Wa (mm) of band-like ply | 5 | 5 | 5 | 5 | 5 | 5 |
| The number of cords of band-like ply | 5 | 5 | 5 | 5 | 5 | 5 |
| The number of windings of band-like ply | 6 | 2 | 6 | 6 | 6 | 2 |
| Road noise performance |  |  |  |  |  |  |
| Low frequency band region (dB) | −0.6 | −0.3 | −0.3 | −0.8 | −1.8 | −0.6 |
| High frequency band region (dB) | −0.7 | −2.9 | −3.0 | −3.2 | −3.2 | −2.2 |

TABLE 2

| Cord material | Nylon |
|---|---|
| Cord cross sectional area S (mm$^2$) | 0.248 |
| 2% modulus M (N/mm$^2$) | 3228 |
| Disposition density D' per one layer (the number of cords/cm) | 10 |
| Elongation resistance value K' per one layer (the number of cords/cm) | 80 |
| Elongation resistance value Kc of band layer (the number of cords/cm) | 80 |
| Band width W1 (mm) | 88 |
| (Ratio of width with respect to belt) (%) | 59 |
| Elongation percentage T(%) of cord | 1.6 |
| Ply width Wa (mm) of band-like ply | 10 |
| The number of cords of band-like ply | 10 |
| The number of windings of band-like ply | 9 |

As shown in Tables, it can be found that according to the present invention tires, not only a road noise in the high frequency band but also a road noise in the low frequency band can be reduced.

What is claimed is:

1. A pneumatic radial tire comprising a belt layer disposed inside a tread portion and outside a carcass in a radial direction of the tire, and a band layer consisting of a pair of edge bands disposed radially outward of the belt layer and at opposite edge portions of the belt layer, wherein when a cross sectional area of one band cord is defined as S (unit; mm$^2$) and a modulus of the band cord when its elongation is 2% is defined as M (unit; N/mm$^2$) and the disposition density of the band cord per 1 cm of the band layer edge bands, is defined as D (unit; the number of band cords/cm), an elongation resistance value K (unit; N·the number of band cords/cm) of the edge bands, which is determined by the following equation (1) is set to greater than 700 and 830 or lower:

$$K = S \times M \times D / 100 \quad (1)$$

and elongation percentage T(%) of the edge band cord in the tire in its natural state in which the tire is not assembled to a rim is set to 0.75% or higher and 1.2% or lower.

2. The pneumatic radial tire according to claim 1, wherein said edge band comprises three edge band plies.

3. The pneumatic radial tire according to claim 1 or 2, wherein a band width W1 of said edge band in an axial direction of the tire is 2% or more and 20% or less of a belt width W2 of said belt layer.

4. The pneumatic radial tire according to claim 1, wherein each of the edge bands is formed in such a manner that one to five band cords are lined up and embedded in a topping rubber to form a tape-shaped band-like ply, and the band-like ply is spirally wound in a circumferential direction of the tire.

5. The pneumatic radial tire according to claim 1, wherein a modulus M of the band cord of said edge bands when its elongation is 2% is 8,000 N/mm$^2$ or higher.

* * * * *